July 4, 1939.  C. L. GREGORY  2,164,770
COMPOSITE PHOTOGRAPHY
Filed Nov. 6, 1936  3 Sheets-Sheet 3

Inventor:
Carl Louis Gregory
BY: Jones Addington Ames & Seibold
Attorneys

Patented July 4, 1939

2,164,770

UNITED STATES PATENT OFFICE 2,164,770

COMPOSITE PHOTOGRAPHY

Carl Louis Gregory, Washington, D. C.

Application November 6, 1936, Serial No. 109,480

1 Claim. (Cl. 88—16)

This invention relates to an improvement in the art of photography as practiced in making motion pictures and is directed to that branch of cinematography commonly known as "trick photography" or, in the nomenclature of those skilled in the art, as "special process photography" and particularly to that branch of special process photography known as composite work.

In composite photography, two or more scenes are combined in correlating or coacting effect into a single film sequence, so that this composite result, when projected on the screen, appears as an integral episode or sequence of events in which the interaction of the moving objects and their relation to each other and to the inanimate objects in the scene, give the illusion of events occurring in natural time and spacial relationship.

The art of dissecting elements from separate scenes and reassembling them into composite sequences requires great skill and accuracy, and the desired effects are usually impossible to obtain by simple staging because of expense, danger to the actors and many other reasons.

Many processes for practicing composite photography are already in use, one of which is the projected background process. In this process the actors perform before a translucent screen behind which is a projector which throws a background scene on the screen, the shutter of the projector being synchronized with the shutter of the taking camera. The actors and the background are photographed at the same time, so that the actors appear to be in the vicinity shown in the background scene.

In using projected backgrounds, any suitable scene already taken may serve as a background for the action in the foreground and action already existing in the background may be, and often is, correlated with the action in the foreground.

The projected background method has numerous limitations. One of the limitations is the difficulty of obtaining sufficient illumination of the projected background, especially when it must be of large size to cover a large field of action in the foreground. Another difficulty is the so-called "hot spot" or area of greater brilliance in the projected background at a spot on the screen around the point where a straight line drawn between the projecting lens and the camera lens intersects the screen. Also the illumination on the screen from the viewpoint of the camera diminishes rapidly from the "hot spot" outward to the edges of the screen. Various means are employed to neutralize this unequal illumination but nearly all of them tend to cut the brighter central area down to the feeble level of the edge portions and thus further limit the effective size of the projected background. The expense of high intensity projectors and large translucent screens, and the large space required for rear projection, limit the use of the projected background method.

Other methods such as the so-called "traveling" mattes have been used. However, all of these methods present serious difficulties and are very often expensive to work. Traveling mattes often cause light or dark lines bordering the action components and give a detrimental false relief or intaglio effect.

Traveling mattes or exposures depending upon the use of complementary colored lights, one for the foreground and the other for the background, introduce color renderings at variance with non-process shots on account of the monochromatic light used for the foreground action and cause ghostlike effects because the color filters commonly used are not entirely impervious to complementary colors of high intensity.

It is an object of the present invention to provide a new and improved means for the production of traveling mattes which will overcome the above noted objections, and provide clean-cut silhouettes of uniform high opacity for matting, and clear film for through printing, with comparative ease and economy in set-up.

Further objects will be apparent from the specification and the appended claim.

It is to be understood that in printing, all related sectional component frames are to be registered with relation to each other and exposed in a printing machine of sufficient mechanical accuracy to maintain this relationship of registry throughout the sequence of film being printed. These precautions and other minor requirements are well known to persons skilled in the art and it is believed unnecessary to describe them in detail.

It is well known in the art that most picture cameras utilize only about 50 percent of the time of taking to expose the film, while the other 50 percent is used to move a fresh portion of the film into position for the next exposure. This invention proposes to use these time intervals of non-exposure to take a second film with a second camera so that the exposure for the second film is made while the shutter of the first camera is closed. The arrangement is such that both cameras have the same optical viewpoint and the respective exposures are made at rapidly alternating intervals, one camera photographing with one type of lighting, while the other uses lighting which produces black silhouettes by photographing the foreground against a white ground.

The silhouettes are the same size and contour as the pictorially lighted foreground, making ideal traveling mattes for double printing in, by any one of several well known methods, any appropriate background suitable to the foreground action.

Figure 1:
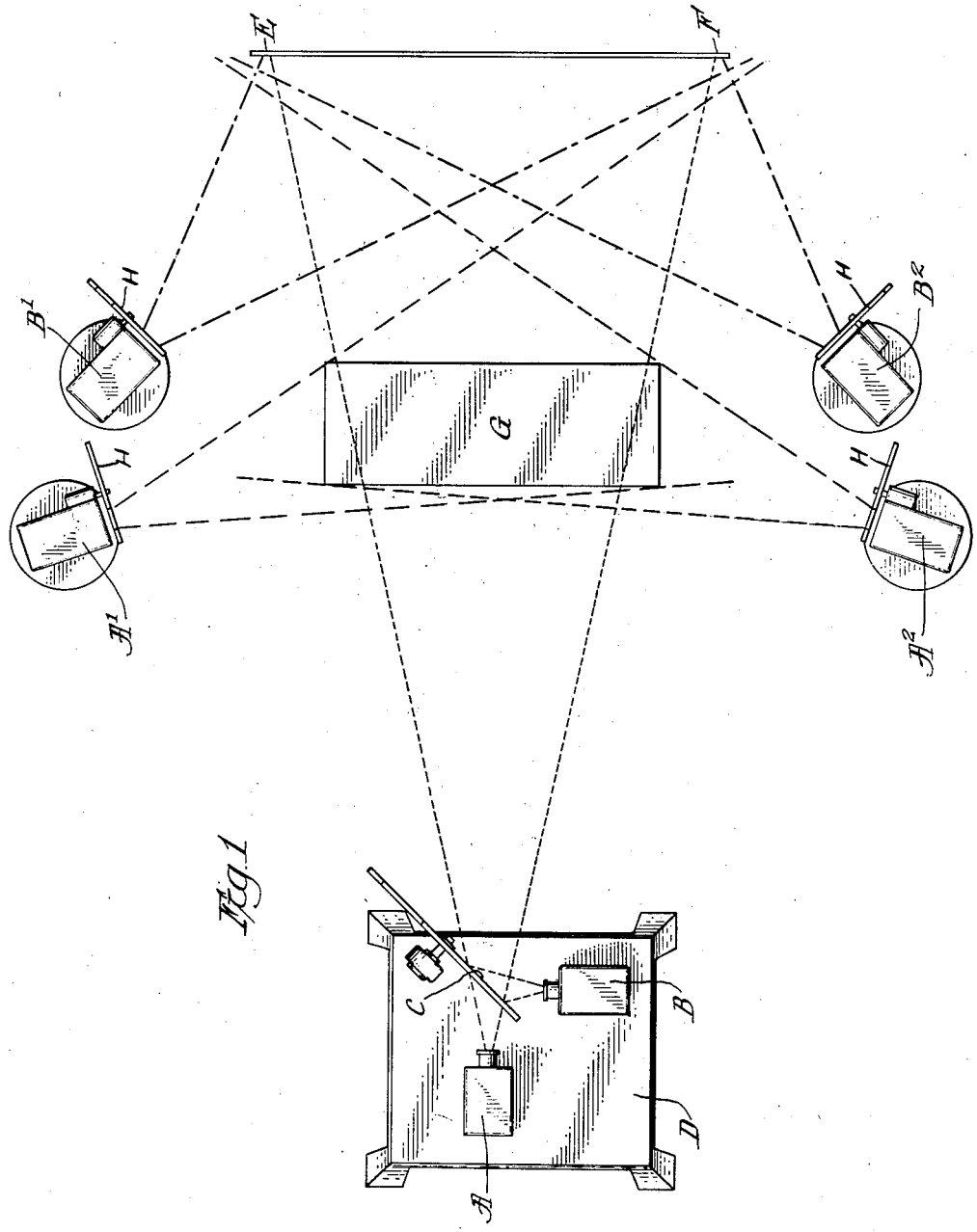
Figure 1 is a plan view of a mechanical set-up on a motion picture studio floor for practicing this invention, the drawings being diagrammatic in character and omitting structure which is not essential to an understanding of the invention.

Referring to the drawings in detail and particularly to Fig. 1, the embodiment illustrated comprises two cameras, A and B, firmly secured to a solid base D, and a revolving semi-circular mirror C arranged with the optical axes of the two matched lenses of the two cameras intersecting at right angles to each other and with the reflecting surface of the semi-circular mirror at an angle of 45 degrees to the axis of the lens in camera B.

Cameras A and B and mirror C may be connected by suitable shafts and gearing, or operated by synchronous motors, or by any other well known method of synchronization, so that each camera shutter is open for exposure while the other is closed, while at the same time the mirror C is adjusted to rotate with its open and closed sectors in unison with the shutters of cameras A and B respectively. Thus in operation, the camera A exposes through the open sector of the mirror C, while camera B exposes to the reflection in the closed sectors of the mirror C.

Means for synchronizing the camera shutters, the light shutters, and the revolving mirror, in the specified relationship are not shown, as such means can readily be devised by those skilled in the art.

The lens of camera A is optically identical with the lens of camera B, and the images made by the two cameras will be identical and superimposible, although reversed from left to right. This reversion from left to right is, however, advantageous, as the two emulsion surfaces when placed in contact for printing will register without the interpolation of the thickness of the film base.

It will be apparent that the two exposures are successive and not actually simultaneous, and that swiftly moving portions of the action may not be in perfect register in the two successive exposures. This is apparent when the two related frames are very closely examined in register, but when thrown on the screen after combination into a composite as hereinafter described, is not detectable.

Figure 2:
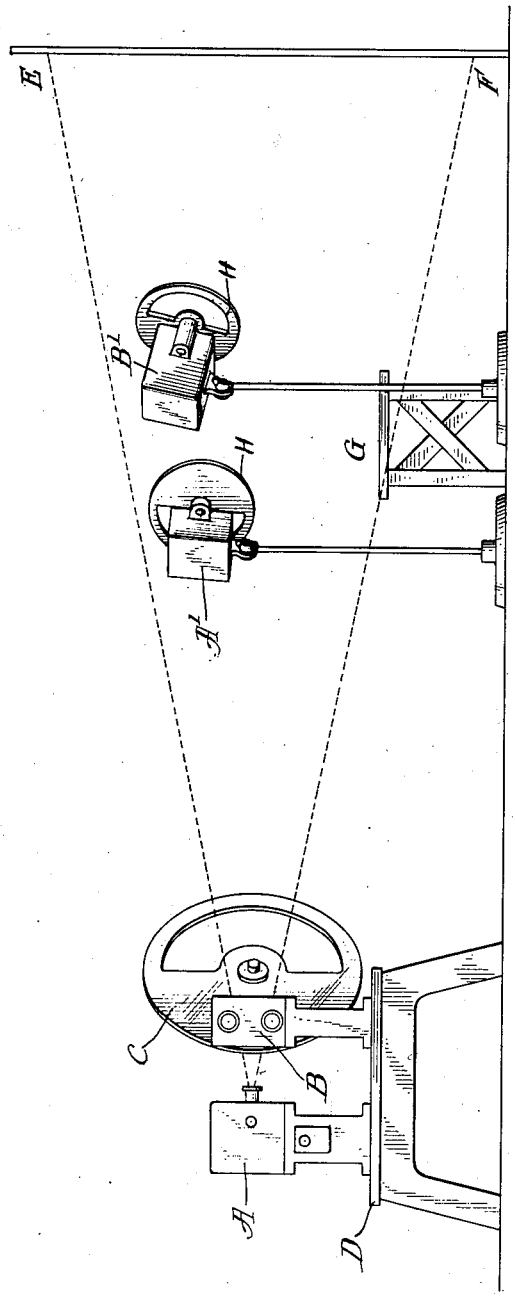
Fig. 2 is a diagrammatic side elevation of the set-up shown in Fig. 1.

A motion picture set, shown in Figs. 1 and 2 as arranged for practising this invention, should be placed in a dark studio, that is, a studio from which all extraneous and uncontrolled light is excluded. To obtain optimum results, one of the cameras, preferably camera A, is arranged to take a pictorially illuminated foreground scene against a black ground, while camera B takes a black silhouette of the action foreground against a white ground. To accomplish this, there are arranged two separately controlled lighting systems represented in Figs. 1 and 2 by the space or platform G on which the action foreground is staged, and the white ground E—F which must be placed far enough behind platform G so that the foreground can be lighted without any direct light on the ground E—F, which latter may be positioned substantially as shown.

Lights $A^1$ and $A^2$ are arranged to illuminate the foreground G without illuminating the ground E—F, while lights $B^1$ and $B^2$ are arranged to illuminate the ground E—F without illuminating the foreground G.

All of the lights are provided with suitable shutters H which may be operated by synchronous motors or by any other suitable method of synchronization, so that the lights $A^1$ and $A^2$ which illuminate the foreground G, flash on during the exposure of camera A while the lights $B^1$ and $B^2$ illuminate the ground E—F during the exposure of the camera B. As the foreground G is illuminated while the ground E—F is in darkness, camera A will produce a negative such as is shown in Fig. 3 with a negative image 1 and a clear non-image area 2.

Figure 4:
Fig. 4 is a silhouette negative frame or traveling matte such as would be produced by camera B in Fig. 1.
Figure 7:
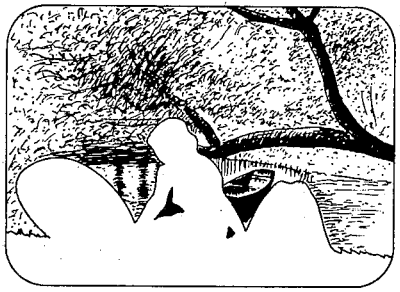
Fig. 7 is a frame printed from the film shown in Fig. 6 while the latter is masked by the positive traveling matte shown in Fig. 5.

Camera B makes its exposure to the mirror after the shutter on lamps $A^1$ and $A^2$ cut off the light from the foreground G and the ground E—F is at that time illuminated by the lights $B^1$ and $B^2$, thereby providing a silhouette negative as shown in Fig. 4, with a clear image area 3 and an opaque non-image area 4.

Figure 3:
Fig. 3 is a foreground negative frame such as would be produced by camera A in Fig. 1.

In other words, the cameras, the lights shutters, and the revolving mirror are all synchronized so that camera A produces the usual negative image such as shown in Fig. 3, and camera B produces a reversed negative thereof with the image area clear and the non-image area opaque as shown in Fig. 4.

Figure 5:
Fig. 5 is a silhouette positive frame or traveling matte such as would be produced by the usual methods of film printing from the negative shown in Fig. 4.

One method of using the camera negatives together with a selected-background negative to produce a positive composite is as follows: The reversed negative shown in Fig. 4 may be printed on positive stock in the ordinary way with enough exposure and contrast development to give the positive silhouette shown in Fig. 5, the latter having an opaque black image 5 and a clear non-image area 6.

Figure 8:
Fig. 8 is a frame from a copy printed as in Fig. 7 followed by a second printing from the action negative film shown in Fig. 3, while the background is masked by the traveling matte illustrated in Fig. 4.

Camera negatives, Figs. 3 and 4, are then placed in registered contact and printed on positive film to produce the action foreground. Before development of this positive film, the positive silhouette, Fig. 5, and the selected background negative, Fig. 6, in contact therewith, are then printed on the same positive film, which, after development, gives the composite result shown in Fig. 8.

It will be apparent that the order in which the component parts are printed may be varied. However, the particular order of printing is immaterial in the result as long as the printing lights are gauged to give the proper matching densities to the completed composite.

The present invention permits all optical printer effects without retakes, including variations in the relation between the foreground and background planes, that is, the background can be brought apparently closer or farther away by enlarging or reducing the background.

There is nothing to distort the image in camera B. Its optical viewpoint is made identical with that of camera A, by means of the sector mirror. Camera B is focused on the foreground action and the outline of the silhouette image produced thereby is as sharp as the outline of the action in camera A and is identical therewith.

Figure 6:
Fig. 6 is a frame from a negative selected as being a suitable background for the foreground action negative shown in Fig. 3.

The fact that the ground may be out of focus is a great advantage. The detail is supplied by the background negative (Fig. 6). If there are small imperfections or unevenness in lighting on the white ground E—F, the more they are blurred and made indistinct, the more even and opaque the resulting background mask will be.

The images in camera A and camera B are identical in contour but one has no detail and an opaque non-image area. The other has full detail and a clear non-image area.

Certain ghostlike or specter effects may be obtained by slightly overlapping the timing of the exposures in the two cameras so as to obtain a graduated control of the apparent transparency of such specters or wraithlike images.

Various accessories and devices, well known to those skilled in the art, may be used to enhance the artistry of the composite pictures without departing from the spirit of the invention.

It will be apparent that this method is extremely simple and provides an accurate composite.

I claim:

In an apparatus for producing an orthochromatic foreground negative with a clear transparent film background and a separate complementary travelling matte negative with an opaque background and clear transparent foreground silhouette; in combination, a darkened stage on which is arranged two cameras with matched objectives fixed on a rigid support, the first of said two cameras having the axis of its objective directed to the center of said darkened stage, a light diverting device fixed on said rigid support near the objective of the first of the said two cameras and positioned to intercept the axial and other light rays entering the objective of the first camera during one half of its cycle of operation and to direct these said light rays to the objective of the second of the two cameras so that said axial ray will coincide with the axis of the objective of the second camera, said second camera being fixed at the same distance from the interception point of the axial ray of said light diverting device as the first camera is fixed from said point of interception and said light intercepting device permitting the light rays to pass to the objective of the first of the said two cameras during the other half of its cycle of operation, in the taking field of said first camera, a foreground area having lamps provided with housings to illuminate only said foreground area and said lamps being provided with controlled shutters adapted to permit the light from said lamps to be cut off from said area or to open and illuminate said area, a white background completely subtending the taking field of said first camera and positioned back of the said foreground area as viewed by the lens of said first camera, said white background being provided with a second set of lamps with housings to illuminate only said background and said second set of lamps being also provided with controlled shutters adapted to permit the light to be cut off from said background or to open and illuminate said background, an interlocked driving control synchronously operating the shutters of the said two cameras and the light diverting device and the shutters of said first and second sets of lights, the opening in the shutter of the first camera and the openings in the shutters of the lights illuminating the foreground area and the opening of the light diverting device being adjusted in relation to the interlocked driving control to expose the foreground area to the film in the first camera during one half of the cycle of the synchronous revolutions of the shutters and of the light diverting device, the opening in the shutter of the second camera and the light diverting sector of the light diverting device and the shutters of the lights illuminating the white background being adjusted in relation to the interlocked driving control to expose the background to the film in the second camera during the other half of the cycle of the synchronous revolution of the shutters and of the light diverting device and repeating the said half cycles in rapid alternation.

CARL LOUIS GREGORY.